UNITED STATES PATENT OFFICE.

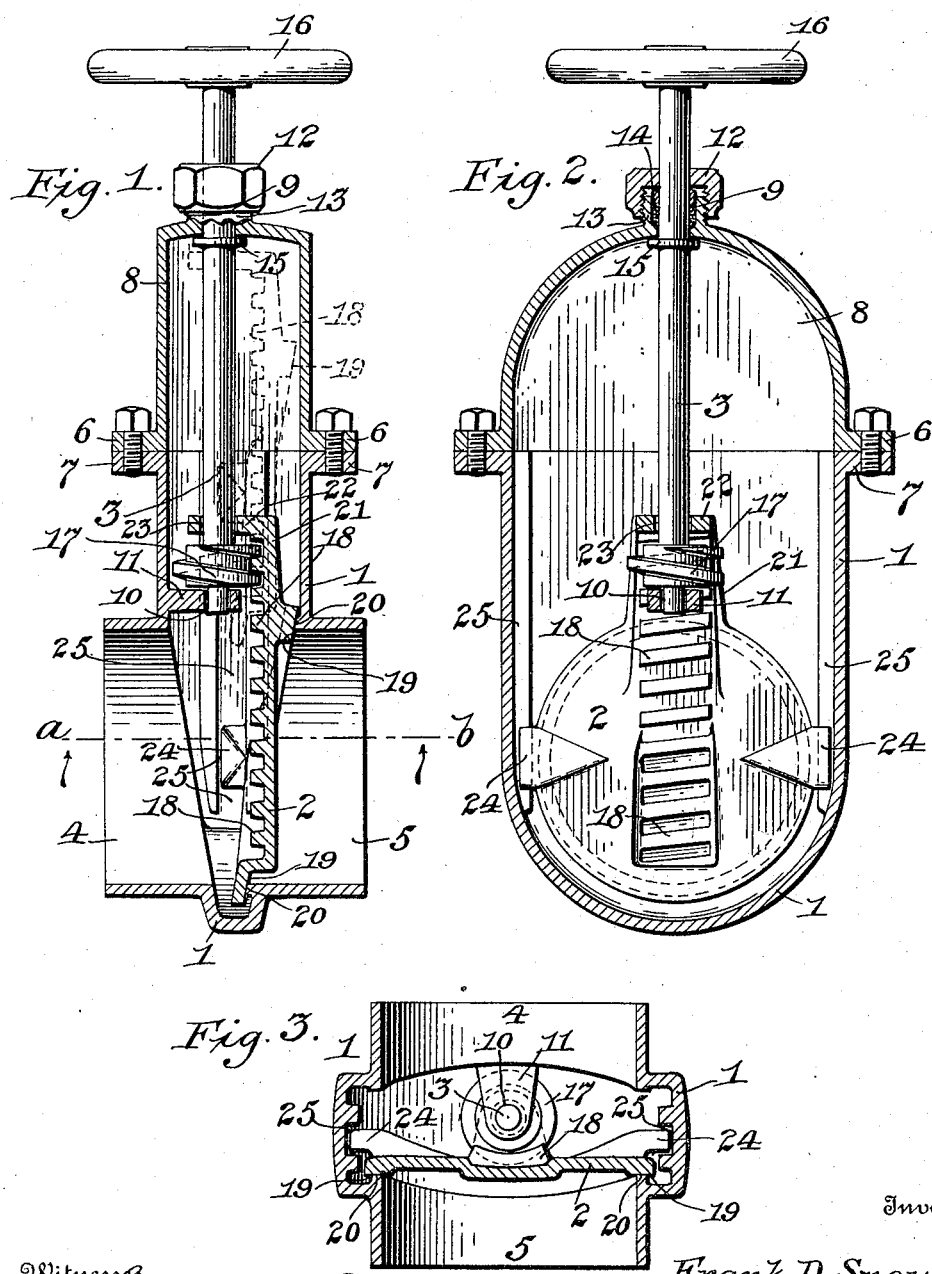

FRANK P. SNOW, OF LOS ANGELES, CALIFORNIA.

VALVE.

1,179,047.　　　　Specification of Letters Patent.　　Patented Apr. 11, 1916.

Application filed July 7, 1910, Serial No. 570,696. Renewed August 23, 1915. Serial No. 46,942.

*To all whom it may concern:*

Be it known that I, FRANK P. SNOW, a citizen of the United States, residing at Los Angeles, in the county of Los Angeles and State of California, have invented certain new and useful Improvements in Valves, of which the following is a specification.

This invention relates to improvements in valves and particularly in those that are commonly known as gate valves, and it has for its object the production of a gate valve that can be applied to piping or other conduits where the flow of liquids is to be checked or controlled.

It is a further object of the invention to provide a valve in which the stem and operating means for controlling the gate or valve proper may be simplified and cheapened in construction and need not be made as massive in proportion to the size of the gate as has been commonly required heretofore.

With these and other objects in view, the invention consists in certain novel constructions, combinations and arrangements of parts as will be hereinafter fully described and claimed.

In the accompanying drawing forming a part of this specification, Figure 1 is a vertical, central, sectional view through a gate valve constructed in accordance with the present invention, the stem and actuating gear carried thereby being shown in side elevation. Fig. 2 is a vertical sectional view through the valve casing taken on a plane at right angles to the plane of the section in Fig. 1 and showing the back of the gate valve and the valve stem with its actuating gear in elevation. Fig. 3 is a transverse sectional view taken through the valve mechanism upon the line *a—b* of Fig. 1.

The valve forming the subject matter of the present invention is designed to supply a gate or slide valve operating in conjunction with a suitable valve seat so that the flow of water or other liquids, through piping, conduits or to or from receptacles of any kind may be entirely checked or partially controlled as found desirable, the gate or valve proper being made of any desired size and yet perfectly balanced so as to move with a minimum of friction and yet be controlled by a less massive valve stem than is usually required for such valves. The relation of the valve to the valve seat is also such that there is no friction between these parts except when the valve is being seated or unseated.

In the accompanying drawing the preferred form of valve mechanism is illustrated and the invention will now be described, reference being had to said drawing.

In the drawing 1 represents a valve casing, 2 the valve proper or slide and 3 a valve stem. The valve casing 1 is provided with oppositely arranged orifices; 4 and 5 through which water or other liquids may pass when the valve is open. The valve casing extends above the orifices a sufficient distance to accommodate the entire movement of the valve 2. The upper part of the casing is generally made in two parts, having meeting flanges 6 and 7 by which the said parts may be bolted together or otherwise secured, the upper part of the casing 8 forming the top or cap of the casing and being provided with a packing gland 9 through which the valve stem 3 passes to the outside of the casing. The said valve stem 3 has a bearing near one end in the said gland 9 while its other or inner end is journaled at 10 in an inwardly extending projection 11 carried by the casing 1. This valve stem 3 has no longitudinal movement, its actuation of the valve being effected by its rotation in the bearings just described. The gland 9 can be made of very simple construction, a cap 12 being screwed upon a cylindrical extension 13 formed upon the casing 8 around the opening through which the valve stem passes. Any suitable packing as 14, may be arranged in the gland for preventing leakage around the stem. A collar or flange 15 is also formed upon the stem 3 and prevents any upward movement of the valve stem and also helps to prevent leakage around the stem at this point. The outer end of the valve stem 3 carries any suitable hand or operating wheel 16 for turning the valve stem. Inside the casing 1 and preferably close to the projection 11, the valve stem 3 carries a valve actuating gear which is in the form of a short worm, as 17, which meshes with the teeth of a rack 18 formed upon the back surface of the valve 2 as clearly shown in Figs. 1 and 2 of the drawing. The rotation of the valve stem and the worm 17, acting upon the rack 18 operates to reciprocate the valve in seating or unseating it and in regulating the opening through which the liquids are to pass. The rack 18 is usually made of sufficient length to permit of the valve being entirely withdrawn from opposite the orifices 4 and 5 when desired and the height of the valve casing above the said orifices is sufficient to accommodate the valve in this range of movement.

The body portion of the valve 2 is made of sufficient thickness to permit of its seating face 19 being arranged upon an angular plane with respect to the plane of the valve's movement and the said seating face 19 is thus adapted to engage the obliquely arranged valve seat 20 formed in the casing 1. By this arrangement the valve is quickly drawn from its frictional engagement with the seat 20 when it is opened, as will be readily understood by reference to Fig. 1 of the drawing. The rack 18 is formed in the thickness of the body portion of the valve for a part of its length and extends out upon a projection 21 for the remainder of its length. The projection 21 extends beyond the seating face 19 and at its outer end is provided with an inturned end 22 which engages the valve stem 3, being provided with a bearing 23 for this purpose. This bearing 23 loosely engages the valve stem 3 so as to readily slide thereon when the valve is reciprocated. To further properly guide the valve 2 in its movement, the body portion thereof is formed with lateral projections 24 extending from its opposite sides and engaging grooves or guide ways 25 formed in the opposite walls of the casing 1. The said projections 24 are preferably arranged about opposite the central part of the valve 2 so as to nearly balance it and in this way, the valve is easily maintained in its balanced position by the projection 22 which slides upon the valve stem 3. Thus there is no chance for twisting or binding in the action of the valve as it is being opened or closed and its movement is facilitated with a minimum of friction.

The parts of this valve are so simple that the valve itself can be cast for use and requires very little finishing, it usually only being necessary to finish the seating face 19 so that it will make a good and even contact with the valve seat 20 when the valve is closed. The valve stem 3 does not carry the valve and move with it, as in the usual form of gate valve and does not have to be made nearly as heavy and strong as is commonly required in valves of this type. The inclined seat and matching face upon the valve facilitate the liberating of the valve from any frictional contact almost immediately upon beginning to open the valve and the remainder of the valve's movement is free and easily accomplished. It will also be observed that a long valve stem is not required and the operating hand wheel 16 always remains at a fixed distance from the casing.

While I have described the preferable form of valve, I wish it understood that I consider all mechanical equivalents of the details of construction shown and described as within the spirit and scope of the invention.

Having now described the invention, what is claimed and desired to be secured by Letters Patent, is:—

1. A valve mechanism comprising a casing having a valve seat therein upon one side of the casing, a bearing projection extending inwardly from the other side of the casing, a valve stem journaled in said projection, a worm gear carried by said valve stem, and a valve having rack teeth formed thereon, adapted to mesh with said worm gear whereby the said valve will be reciprocated upon turning the valve stem.

2. A valve mechanism comprising a casing having an inclined valve seat, a projection opposite thereto forming an abutment bearing for a valve stem, a valve stem journaled upon said abutment bearing, guideways within the casing and extending at an angle with respect to the valve seat and a valve adapted to engage the said inclined valve seat, said valve having a rack thereon arranged parallel with said guideways and a worm gear carried by the said valve stem and meshing with said rack whereby the said valve may be seated without the springing of the rack out of its proper line of travel.

3. A valve mechanism comprising a lower casing section having an inclined valve seat therein and an abutment bearing projecting from the walls thereof, a valve stem journaled upon said abutment bearing, a worm gear carried thereby, a valve having an inclined body portion for engaging the inclined valve seat, said valve having a rack formed thereon with a portion of its teeth embedded in the material of the valve and a portion projecting beyond the surface thereof whereby the rack may extend and be movable parallel with the valve stem and mesh at all times with the said worm gear, guideways upon the inner surface of the casing for guiding the valve with respect to the valve stem, said valve also having a guide projection movably engaging the valve stem and an upper casing section having an outer abutment bearing for said valve stem, the structure being such that the valve stem may rotate but is limited against longitudinal movement.

4. A valve mechanism comprising an inclosing casing formed with oppositely arranged ports for the passage of materials therethrough and having a valve seat surrounding one of said ports, said casing also having opposite guideway recesses extending outside the said ports, guideways in said recesses extending at an angle to the said valve seat, a valve having an inclined edge portion adapted to engage said valve seat and having a rack extending at an angle thereto and parallel with said guideways, a non-rise valve stem extending into said casing in parallel relation with said guideways and rack, a gear carried by said stem and meshing with said rack for seating and unseating the valve, means for keeping the rack in engagement with said gear and guides projecting from said valve into the said recesses of the casing for engaging said guideways.

In testimony whereof, I have hereunto set my hand, in presence of two witnesses.

FRANK P. SNOW.

Witnesses:
FRANK P. SHERMAN,
CASSELL SEVERANCE.

Copies of this patent may be obtained for five cents each, by addressing the "Commissioner of Patents, Washington, D. C."